A. BLANK.
WATER PROOF AND FIRE PROOF MATERIAL FOR ROOFING.
No. 11,106. Reissued Aug. 26, 1890.
FIG. I.
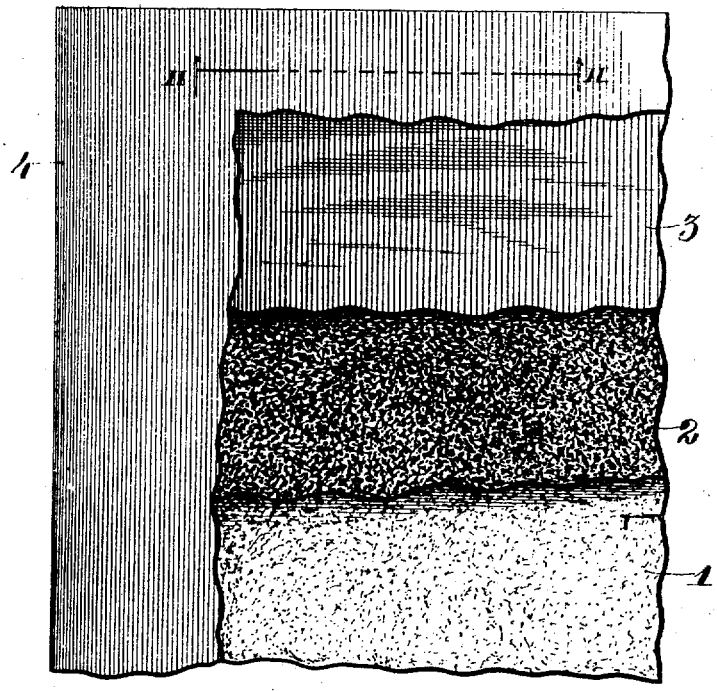
FIG. II.
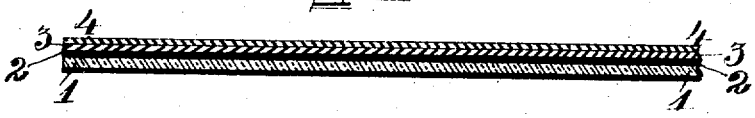
Witnesses
C. F. Koller
Jno. C. Higdon
Edw. J. Higdon
Inventor
Alois Blank.
By his Attorneys
Higdon & Higdon

UNITED STATES PATENT OFFICE.

ALOIS BLANK, OF ST. LOUIS, MISSOURI.

WATER-PROOF AND FIRE-PROOF MATERIAL FOR ROOFING.

SPECIFICATION forming part of Reissued Letters Patent No. 11,106, dated August 26, 1890.

Original No. 409,096, dated August 13, 1889. Application for reissue filed May 17, 1890. Serial No. 352,261.

*To all whom it may concern:*

Be it known that I, ALOIS BLANK, of the city of St. Louis, in the State of Missouri, have invented certain new and useful Improvements in Water-Proof and Fire-Proof Material for Roofing and other Purposes, of which the following is a full, clear, and exact description, reference being had to the accompanying drawings, forming part of this specification.

The object of my invention is to produce a flexible water-proof and practically fire-proof material for roofing, siding, and analogous purposes, the material being composed of asbestus with an intimately-united coating of metal.

Figure I is a view of a sheet exhibiting the various stages of preparation. Fig. II is an enlarged section at II II, Fig. I.

1 is asbestus paper or board of any desired thickness. The asbestus material is first treated with a mixture of powdered plumbago or other non-volatile carbonaceous matter and volatile liquid. The asbestus may be treated upon one or both sides. The volatile part of the mixture is then evaporated by heat, leaving the plumbago or other non-volatile carbonaceous material intimately associated with the fibers of the asbestus. In carrying out this part of the process I have mixed finely-powdered plumbago with sufficient coal-tar varnish to make a thin liquid, which will permeate the pores of the asbestus, the coal-tar varnish acting as a vehicle to carry forward the fine particles of the plumbago. The saturated asbestus 2 is then subjected to heat until all the volatile matter has been thrown off. A thin film 3 of copper is next deposited by electricity upon the asbestus, the copper taking hold of the grains of plumbago, which rest in the interstices of the asbestus, and so becoming closely united with the latter. The material is then immersed in a bath of melted metal, preferably tin, lead, or zinc, or an alloy of any two or more of them. The molten metal is deposited on the copper, and thus a sheet 4 of the molten metal is attached to the asbestus fabric. The material is very flexible, and is practically a non-conductor of heat and fire-proof.

The preferred manner of preparing the article has been herein described; but I do not confine myself strictly thereto. The process has been described more at length in my application filed on the 23d of October, 1888, Serial No. 288,886, where claim is made for the process of manufacture.

It will be understood that no vegetable fiber admits of treatment with molten metal, because the heat of the molten metal would destroy it.

I am aware that vegetable textile fabrics have been coated with copper, but, such material not being fire-proof, and not possessing the qualities of asbestus, is not adapted to my purpose and invention.

Having thus described my invention, what I claim as new, and desire to secure by Letters Patent, is—

1. The metallized asbestus material composed of a body 1 of asbestus having its interstices supplied with carbonaceous material, a coat 3 of copper adhering to the carbonaceous material and entering the interstices of the asbestus, and an outer sheet or layer 4 of metal overlying the copper 3, substantially as set forth.

2. As a new article of manufacture, asbestus having an intimately-united coating of metal applied thereto, substantially as set forth.

ALOIS BLANK.

Witnesses:
C. K. JONES,
JNO. C. HIGDON.